United States Patent [19]

Barbero et al.

[11] Patent Number: 5,006,929
[45] Date of Patent: Apr. 9, 1991

[54] METHOD FOR ENCODING AND TRANSMITTING VIDEO SIGNALS AS OVERALL MOTION VECTORS AND LOCAL MOTION VECTORS

[75] Inventors: Marzio Barbero; Mario Muratori; Mario Stroppiana, all of Turin, Italy

[73] Assignee: Rai Radiotelevisione Italiana, Turin, Italy

[21] Appl. No.: 489,446

[22] Filed: Mar. 6, 1990

[30] Foreign Application Priority Data

Sep. 25, 1989 [EP] European Pat. Off. ........ 89830414.2

[51] Int. Cl.$^5$ .............................................. H04N 7/12
[52] U.S. Cl. ................................... 358/105; 358/135; 358/136
[58] Field of Search ................ 358/136, 135, 105, 433

[56] References Cited

U.S. PATENT DOCUMENTS

| | | | |
|---|---|---|---|
| 4,689,673 | 8/1987 | Ohki et al. | 358/136 |
| 4,769,826 | 9/1988 | Kubo et al. | 358/136 |
| 4,845,566 | 7/1989 | Kondo et al. | 358/135 X |

OTHER PUBLICATIONS

Marzio Barbero et al., "Coding Strategies Besed on DCT for the Transmission of HDTV", Feb. 1988, 2nd Int'l Wkshop in Signal Processing of HDTV, vol. 2, pp. 3–8.

M. Barbero et al., "A Flexible Architecture for a HDTV Code Based on DCT", Aug. 1989, 3rd Int'l Wkshp on HDTV, vol. 3.

Primary Examiner—Victor R. Kostak
Attorney, Agent, or Firm—R. Neil Sudol; Henry D. Coleman

[57] ABSTRACT

A redundancy reduction algorithm, such as hybrid DCT, is applied to a video signal and is subsequently encoded by pixel blocks, and motion vectors are generated for each image block. At least one global motion vector is then generated for the entire image, the block motion vectors are substracted from the global vector to obtain local motion vectors representing the shifts from the global vector, the global vector is encoded with fixed length, the local vectors are encoded with variable length, and the coded global vector and the coded local vectors are multiplexed into the coded video signal to be transmitted.

9 Claims, 2 Drawing Sheets

METHOD FOR ENCODING AND TRANSMITTING VIDEO SIGNALS AS OVERALL MOTION VECTORS AND LOCAL MOTION VECTORS

BACKGROUND OF THE INVENTION

The present invention relates to a method for encoding and transmitting video signals, particularly but not exclusively digital, and processing the signals to reduce redundancy, and comprising the use of motion vectors indicating global movements of image parts.

Digital encoding systems for video data are known in which algorithms for reducing the redundancy re used to reduce the amount of transmitted binary data with respect to the amount of source data. An example of a method of this type, called hybrid DCT (Discrete Cosine Transformation), can be found in "Coding Strategies Based on DCT for the Transmission of HDTV", by M. Barbero, S. Cucchi, M Stroppiana, 2nd International Workshop on HDTV, Feb. 29–Mar. 2, 1988, L'Aquila, Italy. The described method can be improved, within the known state of the art, by using the evaluation and then the compensation of motion. In this way the time redundancy is eliminated not just in the motionless parts but also in the parts with determined motion, i.e. non-chaotic motion.

Other similar image coding methods are known, in which a time sub-sampling of the image is provided, where motion compensation can be used to improve the received and reconstructed image quality.

In the above mentioned known methods, the image is divided into sub-parts, such as blocks of $8 \times 8$ pixels, and for each of those blocks an overall motion vector is determined, i.e. the displacement of that image block, from the preceding frame to the successive one, is estimated in pixel number or a fraction thereof.

The image processing provided in the transmitter uses the information related to the displacement of each image block and transmits the processed image and the motion vector coordinates (vertical component and horizontal component) of each block to the receiver.

The image is reconstructed on the basis of those motion vector coordinates together with further service information supplied by the transmitter. The derivation of the motion vectors and their transmission are performed for each frame.

For a simpler description, the word "frame" will be always mentioned to designate the whole of the elements constituting a single image and both the so called "frame" and the so called "field", particularly in television.

Usually, the motion vectors are evaluated within a window, for example $+-15.5$ pixel and $+-7.5$ lines, because it is believed that most of the motion in an image is less than 16 pixels and 8 lines per frame.

The coordinates of those vectors can be transmitted, in the simplest way, for each image block. For a fixed-length coding, in the case of the above mentioned window, and for a half pixel precision, this would require eleven $(6+5=11)$ bits per image block, i.e. a significant increase of information to be transmitted, such as to limit the advantages of the redundancy reduction obtained with the DCT plus variable-length encoding. Even considering that some values are more probable than others and that the variable-length motion vectors are themselves encoded, no considerable advantages are obtained.

In order to reduce the binary information in the motion vectors transmission, it has been proposed to use a menu-based transmission. For each frame, a fixed number, for example 32, of most frequent motion vectors is selected and transmitted and for each block, the selected motion vector address is set in the menu. In this manner, just 5 bits per block are sufficient, saving 6 bits with respect to the preceding case, but the selection and assignment of the 32 vectors turns out to be quite complex and burdensome.

Still within the aim of reducing the information flow, or the transmitted bit rate, differential motion vector coding has also been proposed, which consists in transmitting only the motion change for each block, with respect to the same block in the preceding frame. Since usually, the motion of an object is sufficiently uniform, those changes are usually small, and the probability density of the transmitted values is quite peaked around zero; hence the variable-length code transmission turns out to be highly efficient, and the saving in transmitted bits is enormous. Unfortunately, as will be evident to the man skilled in the art, this method accumulates error from one frame to the next, and is therefore highly sensitive to even sporadic channel errors.

SUMMARY OF THE INVENTION

An object of the invention is therefore to overcome the above-mentioned drawbacks of the known methods for encoding and transmitting video signals and the associated motion vectors, by providing a method of motion vector transmission having a minimum information flow, high transmission efficiency, lower burden for data processing, and without harmful secondary effects such as vulnerability to channel errors and the like.

The invention achieves the intended object, together with other objects and advantages that will be apparent from the following description, by a system for encoding and transmitting video signals having motion vectors, wherein a redundancy reduction algorithm is applied to the video signal which is subsequently encoded for selected pixel blocks and motion vectors are generated for each image block, and wherein: a global or overall motion vector is furthermore generated for the entire image or an array of image blocks, the motion vectors are subtracted from the global vector to obtain local motion vectors representing the differences with respect to the global vector, the global vector is encoded at fixed length, the local vectors are encoded at variable length, and both the coded global vector and the coded local vectors are multiplexed in the transmitted signal.

BRIEF DESCRIPTION OF THE DRAWINGS

The invention will be now described in more detail according to some preferred embodiments, illustrated in the enclosed drawings by way of non-limiting examples, wherein.

DETAILED DESCRIPTION OF THE PREFERRED EMBODIMENTS

Figure 1:
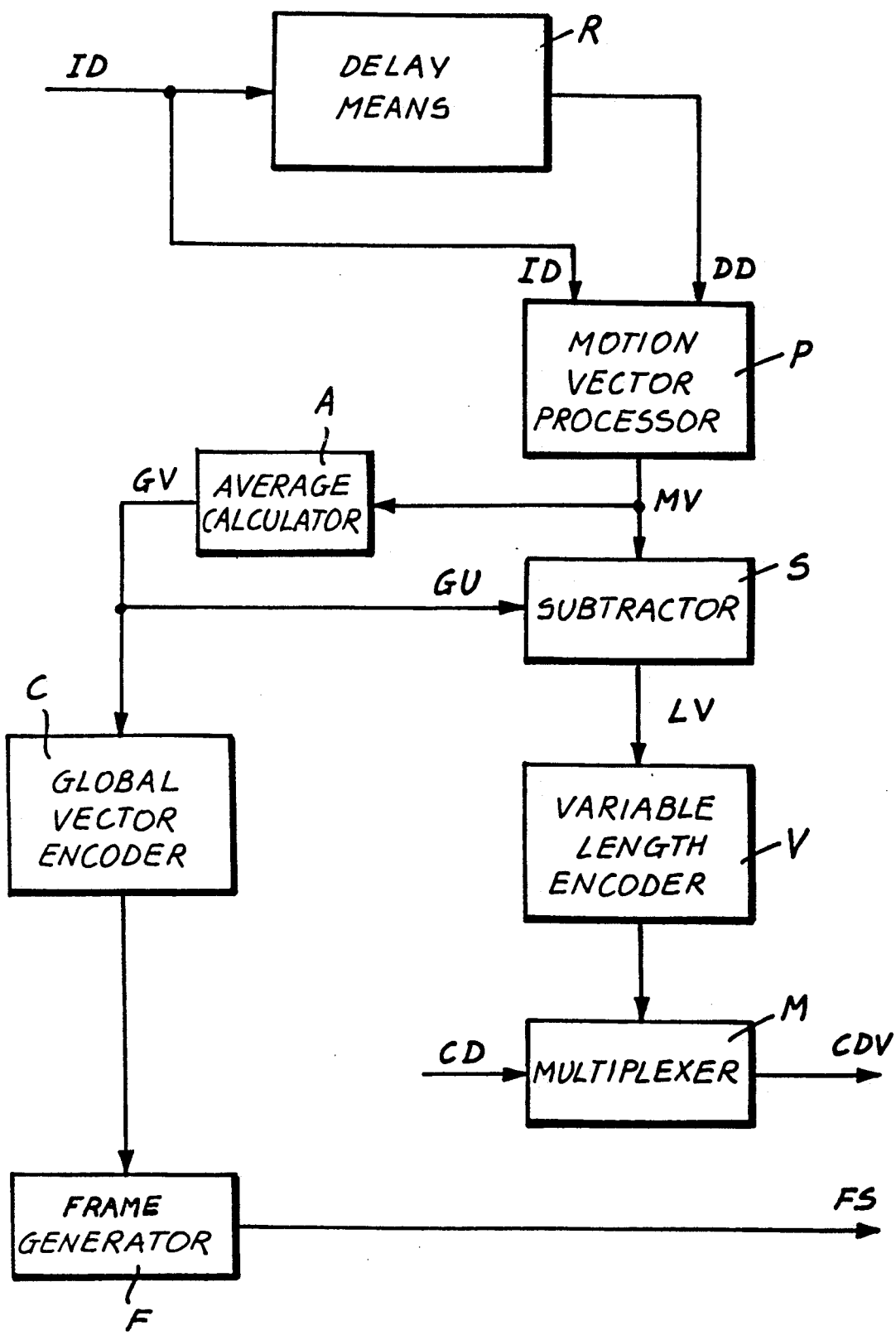
FIG. 1 is a block diagram of an apparatus according to a first preferred embodiment of the invention.

With reference to FIG. 1, each frame of a digital video signal or image signal ID, per se known, it applied to a frame delay means R, which provides an output signal DD, in principle identical to signal ID, but suitably delayed. The delay means R can be any of the available devices, known in the art for delaying a digital signal, such as a shift register or a Random Access Memory which is suitably scanned on reading and writing, or any other selected device.

Signals ID and DD are applied to the two inputs of a motion vector processor P (also per se known), which compares the two signals for successive image blocks in the frame, generating a succession of motion vectors MV, as an output signal. Motion vectors MV have two components, respectively horizontal and vertical, but those two components will be assumed to be combined in one digital work.

Usually, an image block is formed by 8×8 pixels but in this context and in the claims, the term "block" should be more generally understood as a rectangular image part having sides formed by arbitrary numbers of pixels, or even as a non-rectangular image parts.

The motion vectors MS successions are applied to an average calculator A, which, for each frame, provides an output signal GV which is the (vectorial) average of vectors MV of that frame, and hence constitutes a global or overall motion vector for the entire frame, i.e. a vector reflecting possible global movements of the entire image of of a significant part of it, such as in the case of pan shots (pannings) or of a dominant object moving in the image.

On the one hand, global vector GV is applied to a global vector encoder C which encodes the global vector with fixed-length code, protects it against channel errors with known techniques and applies it to a per se known transmission from generator F, for insertion in the binary data stream FS, transmitted with frame timing, according to the conventional techniques of digital data transmission.

On the other hand, global vector GV is applied to a first input of a subtractor circuit S, which also receives at a second input the output signal MV from the motion vector processor P, and, frame after frame, generates the vectorial differences LV between MV and GV. Output signal LV is therefore constituted by a succession of local motion vectors that indicate how much each particular block displacement differs from the global image motion as indicated by the global vector GV.

Local vector LV are then encoded with variable length, in a variable-length encoder V, and are multiplexed, in a multiplexer M, with the image data stream CD (encoded with variable length) generated by a further known apparatus, not illustrated since it is not part of the invention. The output data stream CVD of multiplexer M is than transmitted in a conventional manner. The multiplexing can be performed according to any selected convention, for example the variable-length work constituting local vector LV can be placed before the work string of words representing the image block.

At reception, the local vectors are encoded block by block and are added to the global vector which is extracted from the signal at the beginning of each frame. The complete vectors are then used in the receiver in a conventional manner. Although the variable-length encoding of local vectors LV can be performed according to a selected arbitrary code, according to a particularly preferred embodiment of the invention, such code is the same used for the encoding of the image signal because, as seen above, the probability density of the local vectors is peaked around zero and therefore, as will be apparent to the person skilled in the art, it renders use of VLC encoding particularly suitable. In this manner the code word decoding is simplified and therefore also the video signal reconstruction in the receiver.

It is also contemplated to subdivide the image into a number of sub-images and to associate a global or overall motion vector to with each of the sub-images, and, for each sub-image, to generate the local vectors referred to the global vector of that sub-image.

With the above-described method, the local vectors add just a few bits to the information relevant to each image block, i.e. an equal or lower burden than that for a menu-based transmission, still giving a greater potential precision. The global vector is a small overhead, because it is distributed among all the frame blocks. The protection against errors is high and there is no error propagation to the successive frames.

Figure 2:
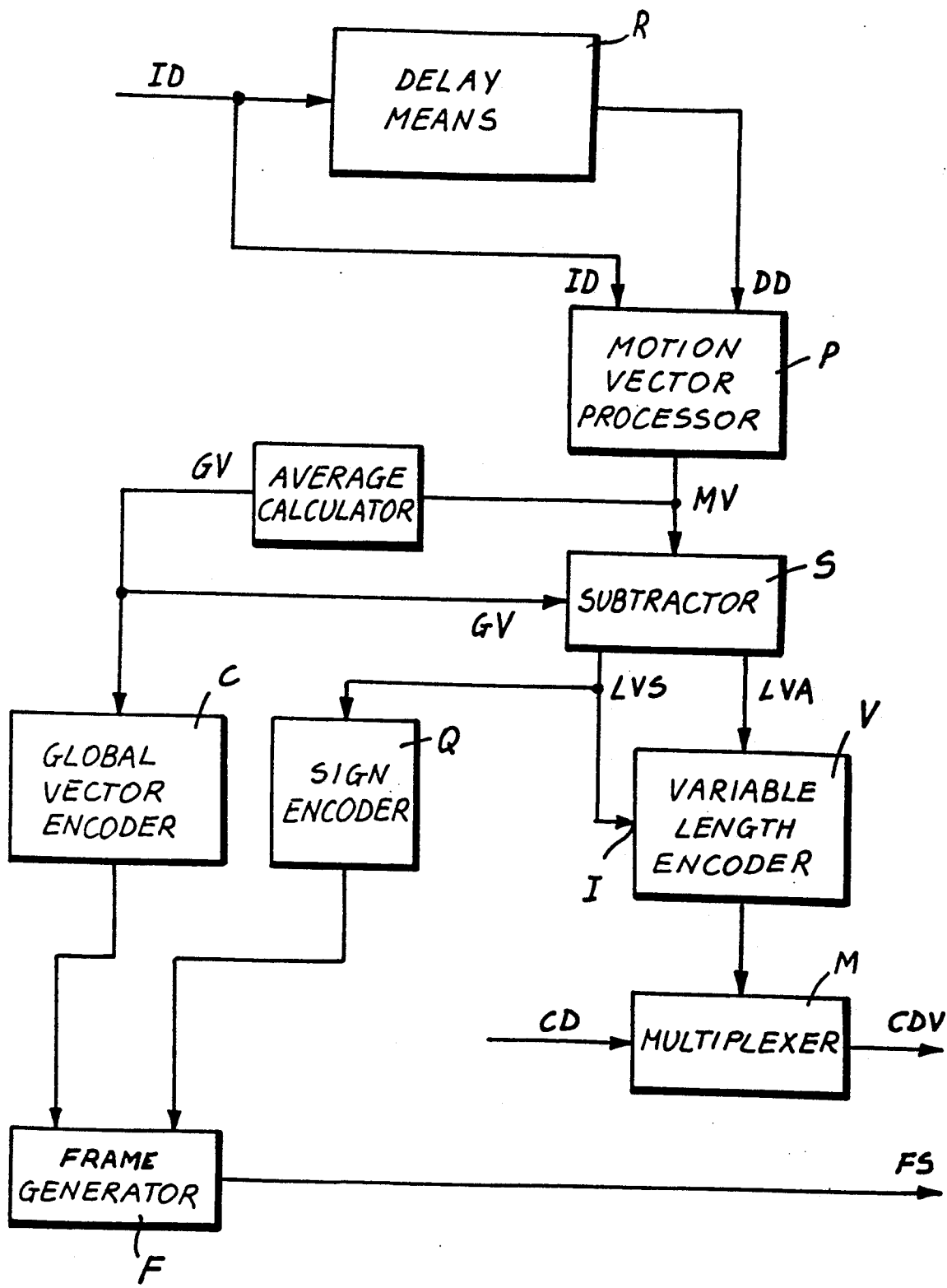
FIG. 2 is a block diagram of a variant of FIG. 1, according to a second preferred embodiment of the invention.

FIG. 2 illustrates a block diagram variation according to a second aspect of the invention, which is advantageous in the case of color video signals of reduced redundancy, by means of the hybrid DCT method mentioned above. In this case (cfr. M. Barbero, S. Cucchi, J. L. Hernando Bailon, "A flexible Architecture for a HDTV COded Based on DCT", 3rd International Workshop on Signal Processing of HDTV, 1989, Torino, Italy), the encoder has a packet transmission frame structure subdivided into two streams: a first streams contains the variable length words, i.e. the DCT coefficients for each signal block, while the second stream contains just the information transmitted with fixed-length codes. The latter stream includes a 5-bit group for each quadriblock (i.e. for each set of four 8×8 pixel blocks comprising two blocks for the luminance data and two blocks for the two chrominance components), the 5 bits indicating how each block of the quadriblock has been processed, for a total of 27 combinations. Of the 32 possible combinations for the 5 bits of this data, 5 combinations are therefore unused by the prior art.

The block diagram of FIG. 2, similarly to FIG. 1, illustrates: a delay means F, which delays the digital video signal ID generates a delayed version DD, a processor P of the motion vectors MV, an average calculator A generating the global vector GV which, after encoding in a fixed-length encoder C, is fed to transmission frame generator F. The subtractor S receives the vectors MV and the global vector GV, producing their differences LV, or local vectors, in the same manner as FIG. 1.

However, according to the embodiment of FIG. 2, the local vectors LV, coming from subtractor S, are subdivided into a sign signal LVS and an absolute value signal LVA. The sign signal LVS obviously represents one of the four possible combinations of the signs of the two, horizontal and vertical, local vector components (++,+−,−−,−+), indicating toward which of the four space quadrants is lying the local vector points; and, moreover, in case the local vector is zero (as highly probable, for the reasons already mentioned), signal LVS will assume a specific value, indicating such a condition. The signal LVS is then applied to an encoder Q which in turn applies it to transmission frame generator F in order to insert it in the fixed-length encoded data stream mapped on one of the five possible unused combinations of the aforementioned 5-bit group associated to each quadriblock.

Signal LVA is fed to the variable length encoder V and therefrom to the multiplexer M, as in FIG. 1. In this case though, the encoder V receives the sign signal LVS too, on an inhibition input I, so that the code emission toward the multiplexer M is inhibited when LVS indicates that the local vector is zero. Therefore, in the highly probable case that the local vector is zero, it is not inserted in the variable-length encoded video data stream, with a further saving of bits. This situation is then easily discerned in the receiver, by using the sign signal LVS.

The embodiment of FIG. 2 is even more advantageous regarding the bit saving in the total data stream. With respect to the first embodiment, the following bits are saved: on the one hand, the two sign bits, hidden with no charge in the 5-bit group mentioned above; on the other hand, the zero code of the local vector, having high probability of appearance. Furthermore, the absolute values of the local vectors have an even more favorable statistical distribution, than the complete local vectors: it is therefore more efficient to perform the variable-length encoding with the same code of the image data.

some of the preferred embodiments of the invention have been described but, obviously, within the inventive concept, many modifications and variations are obvious to the man of the art. For example, in both the described embodiments, the average calculator A can be replaced by any other device adapted to calculate the global vector with algorithms other than the simple arithmetical mean, for example algorithms of weighed mean, of statistical mode or median, or others. Furthermore, even though in the above description reference is usually made to video signals having reduced redundancy obtained by means of DCT conversion, because it is presently the most preferred one, it is apparent that the teachings given can be used even with other algorithms for reducing the redundancy. Finally, even though the given examples relate to wholly digital video signals, the invention can be used even for video signals, transmitted analogically and comprising auxiliary signals in digital form, for example as pulse sequences contained in the line or frame blackout periods.

We claim:

1. A method for encoding and transmitting a video signal representing a succession of images, each image being sub-divided into a number of pixel blocks and a motion vector being associated with each block, the method comprising the following steps:
   (a) processing the video signal with a redundancy reduction algorithm;
   (b) encoding the processed video signal pixel block by pixel block;
   (c) grouping the pixel blocks of each image into at least one array of pixel blocks;
   (d) generating an overall motion vector for each array of pixel blocks in each image;
   (e) subtracting the motion vectors associated with the pixel blocks from the respective overall motion vector to obtain corresponding local motion vectors representing the difference with respect to the respective overall motion vector;
   (f) encoding the overall motion vector with fixed length, and encoding the local motion vectors with variable length, to obtain respective coded motion vectors; and
   (g) multiplexing both the coded overall vector and the coded local vectors into a transmitted signal.

2. The method of claim 1, wherein the pixel blocks of each image are grouped into one array of pixel blocks covering the entire image.

3. The method of claim 1, wherein the pixel blocks of each image are grouped into a plurality of arrays of pixel blocks in each image.

4. The method of claim 1, wherein said video signal is digital and said local motion vectors are encoded with the same variable-length code with which the video signal is encoded.

5. The method of claim 1, wherein said video signal is digital and the signal transmission is divided into a first data stream including the variable-length words and into a second data stream including the fixed-length words, said local vectors being encoded with variable-length words and being transmitted with said first data stream.

6. The method of claim 5, wherein a local vector absence signal is furthermore generated and transmitted with said second data stream when said local vector is zero, no variable-length word being transmitted in such case to represent the zero absolute value of the local vector.

7. The method of claim 5, wherein the absolute values of the local vector components are encoded with variable-length words and are transmitted with said first data stream, and wherein a direction signal is generated to represent the geometric quadrant in which the local vector points, said direction signal being encoded with fixed-length words and transmitted with said second data stream.

8. The method of claim 7, wherein said direction signal is coded to indicate a zero value of the local vector, no variable-length word being transmitted in such case to represent the zero absolute value of the local vector.

9. The method of claim 7, wherein said second data stream includes a 5-bit group indicating the processing mode of an associated block, and wherein 5 of the 32-bit combinations are not used for said indication, said direction signal and said absence signal being encoded in said respective 5 combinations.

* * * * *